United States Patent [19]
Poggie

[11] 3,923,345
[45] Dec. 2, 1975

[54] ANTI-SKID BRAKING SYSTEM WITH TORQUE SENSING MEANS

[76] Inventor: Joseph Louis Poggie, 815 Iris Lane, Vero Beach, Fla. 32960

[22] Filed: Oct. 3, 1974

[21] Appl. No.: 511,781

[52] U.S. Cl. ...... 303/21 CH; 188/106 P; 188/181 T; 188/346
[51] Int. Cl.² .......................................... B60T 8/00
[58] Field of Search............ 303/21 CH, 21 R, 21 F; 188/106 P, 106 R, 106 F, 106 A, 152, 151 R, 181 T, 2 A, 180, 346; 192/35, 34, 36

[56] References Cited
UNITED STATES PATENTS

| | | | |
|---|---|---|---|
| 3,137,370 | 6/1964 | Lepelletier | 188/346 |
| 3,220,781 | 11/1965 | Wooler | 303/21 CH X |
| 3,277,982 | 10/1966 | Kimberlin | 188/346 |
| 3,346,078 | 10/1967 | Dobb | 188/346 |
| 3,724,610 | 4/1973 | Caero | 303/21 CH X |

*Primary Examiner*—Trygve M. Blix
*Assistant Examiner*—Douglas C. Butler
*Attorney, Agent, or Firm*—Duckworth, Hobby & Allen

[57] ABSTRACT

A vehicle wheel anti-skid braking system is provided which senses the torque applied to a vehicle wheel by the road and uses this torque to control the brake force, thereby limiting the brake torque capacity of the anti-skid braking system in such a way that it cannot exceed the torque capacity of the wheel-road contact.

16 Claims, 4 Drawing Figures

3,923,345

ANTI-SKID BRAKING SYSTEM WITH TORQUE SENSING MEANS

BACKGROUND OF THE INVENTION

The present invention relates to anti-skid devices and especially to an anti-skid brake for vehicle wheels which utilize the wheel torque to control and limit the wheel brake so that the braking torque cannot exceed the torque capacity of the wheel-road contact.

It has been known for some time that under most road conditions, skidding does not occur suddenly as a result of an instantaneous switch from the coefficient of rolling friction to the coefficient of sliding friction at the wheel-road contact and a corresponding switch in the brake from a coefficient of sliding friction to a coefficient of static friction. The change from rolling contact to skidding is a gradual transition where the coefficient of friction varies with the tire slippage while the brake switches from sliding friction to static friction at the instant the wheel reaches 100% slippage.

A great many anti-skid devices sense wheel rotation, vehicle deceleration, or brake pressure to indicate a skid condition. These systems use an electronic circuit to pump or pulse the brake pressure causing the tire-road contact to alternate between 100% skidding and near 100% skid conditions. These prior art systems improve braking but have a number of disadvantages including the fact that they do not provide optimum stopping conditions but instead operate in the high percentage skid area and thus only prevent sustained full skids. Their effectiveness is influenced by road conditions since any given wheel rotation rate, vehicle deceleration or brake pressure could occur at any point in the range of skid. The systems are complicated by complex electronic-fluid circuitry resulting in high cost of manufacturing, installation and maintenance.

There are also a number of anti-skid devices which sense wheel torque and use this sensed torque to operate electro-hydraulic servo valves, but these similarly have serious disadvantages, such as the fact that they control skidding about the maximum skid condition instead of the optimum stopping condition. At best, they act to prevent 100% skidding but do nothing to provide optimum stopping.

The present invention, on the other hand, relates to a combination of devices which are directed toward insuring optimum braking of a vehicle on any road by adapting the braking force to the existing road-wheel friction condition. This invention senses the torque applied to the road to the wheel and uses this sensed torque to control and limit the brake force thus making the braking capacity limit dependent on the road condition. The present invention insures that the vehicle will stop in the shortest possible time for any road condition and will never permit the wheels to reset a 100% skid.

SUMMARY OF THE INVENTION

An anti-skid brake mechanism is provided having a fluid actuated system for applying fluid pressure to a brake. A torque measuring pilot brake is provided for actuation by the fluid actuation system for sensing a torque created by the road-wheel contact. A valve system is provided for converting the torque measured by the pilot brake into fluid pressure to control and power the main brake. Provisions are also provided for special conditions, such as going suddenly from a dry surface to a wet surface, where the braking system automatically pulses itself to adapt to the changing condition.

BRIEF DESCRIPTION OF THE DRAWING

Other objects, features, and advantages of the present invention will be apparent from the description and the drawings in which.

DESCRIPTION OF THE PREFERRED EMBODIMENTS

Figure 1:
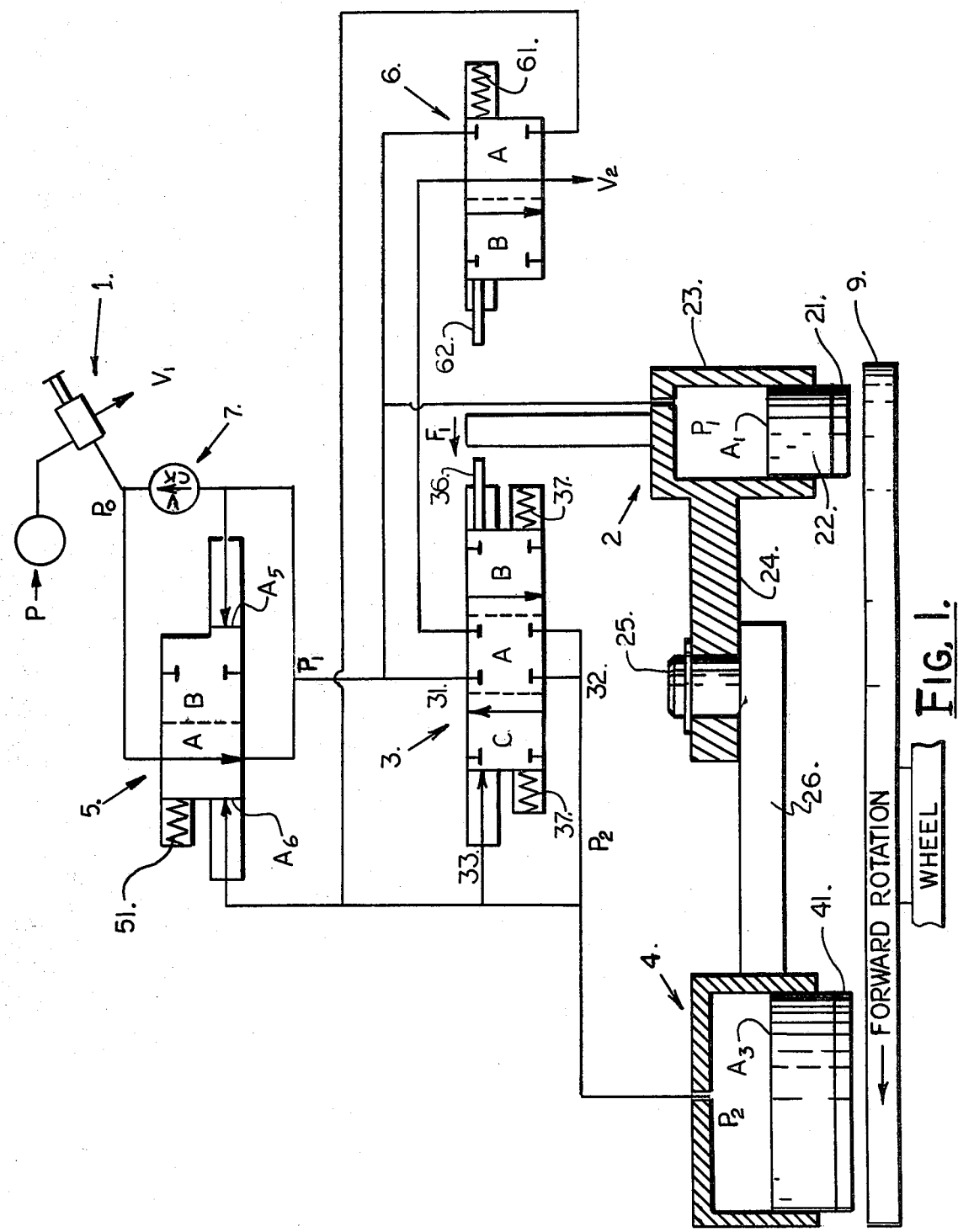
FIG. 1 is a schematic view of a preferred embodiment of the present invention intended for use as a pneumatic system having a combination of pilot brake, main brake, and valve system.
Figure 2:
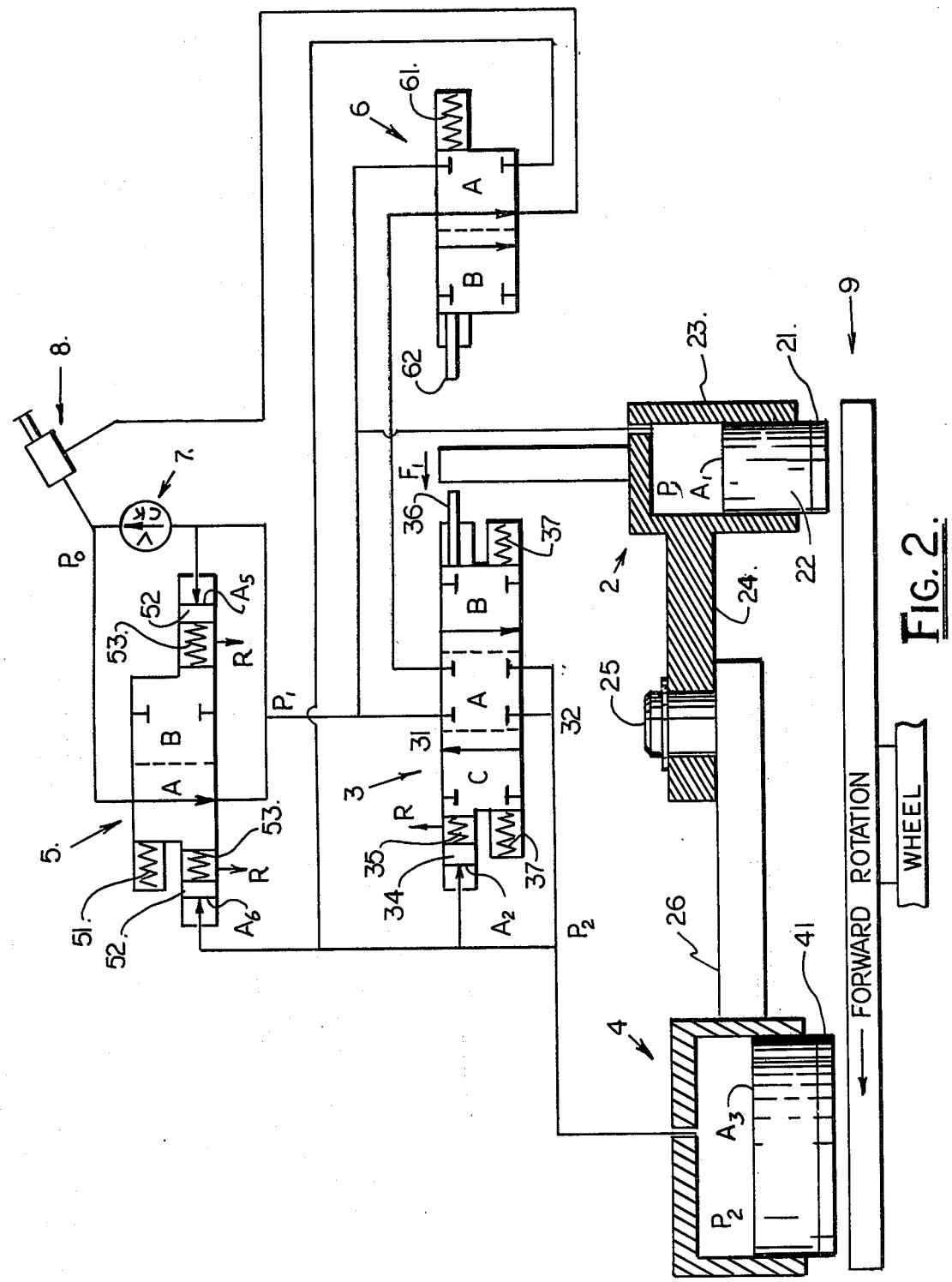
FIG. 2 is a schematic view of the preferred embodiment of the present invention intended for use in a hydraulic system.
Figure 3:
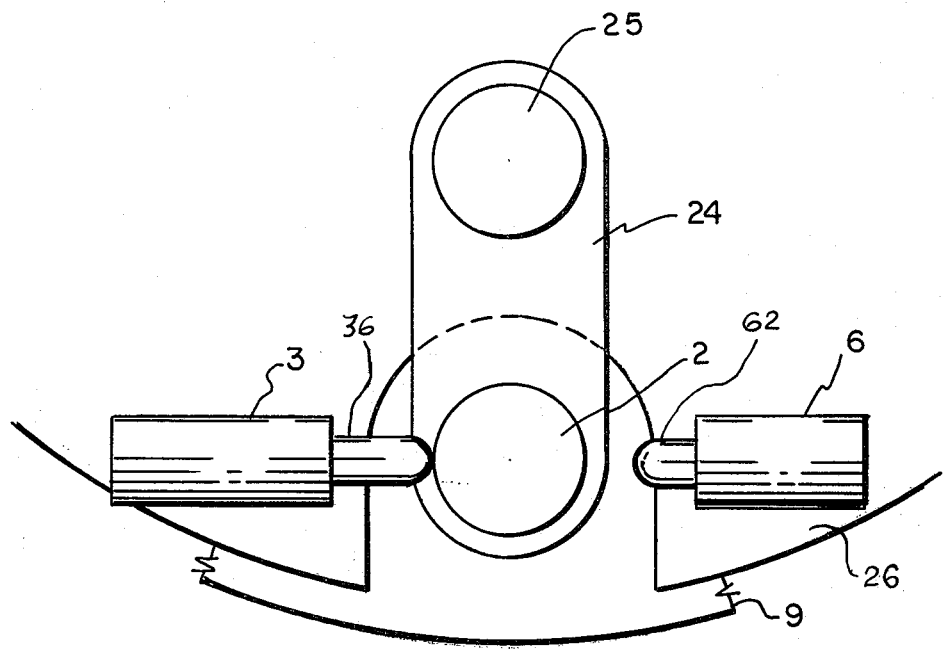
FIG. 3 is a cut-away side plan view of the pilot brake assembly and its mounting means.
Figure 4:
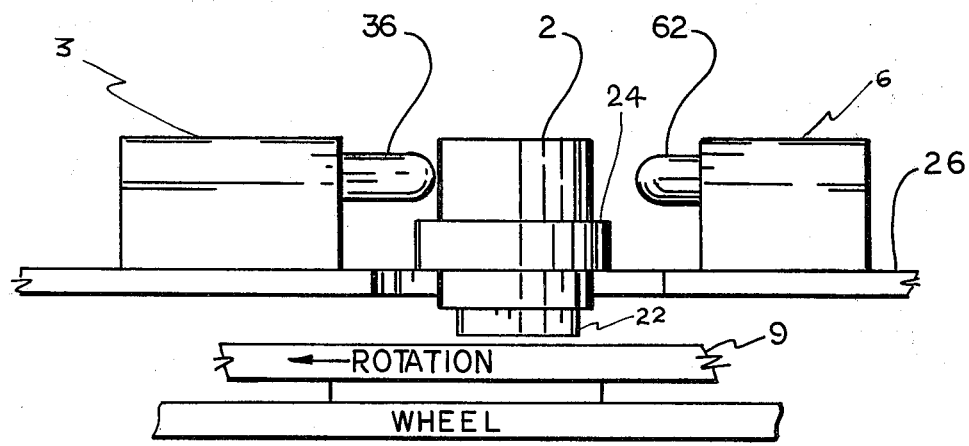
FIG. 4 is a cut-away top plan view of the pilot brake assembly of FIG. 3.

Referring now to FIGS. 1 through 4 of the drawings, there are two embodiments of the present anti-skid braking system illustrated in schematic views. The pneumatic system of FIG. 1 and the hydraulic system of FIG. 2 operate identically except for the differences hereinafter set forth. FIGS. 3 and 4 provide additional details of the pilot brake assembly.

The system shown in FIGS. 1, 3, and 4 includes a conventional pneumatic master brake control valve 1 which is operated by a driver; a pilot brake assembly 2 which is operated by the control pressure $P_1$ from a limiting valve 5; a three-position, spring centered, force balancing valve 3 which is pressure operated in one direction by main brake pressure $P_2$ and is mechanically operated in the other direction by the movement of the pilot brake assembly 2.

The embodiment of FIG. 1 also includes a main brake assembly 4, which is operated by fluid pressure $P_2$ and is in turn controlled by balancing valve 3; a limiting valve 5 which compares $P_1$ and $P_2$ and acts to prevent $P_1$ from increasing when $P_2$ can no longer increase; and a conventional wheel brake disc or drum 9 which hereafter is called a disc against which the pilot brake pad 21 and the main brake pad 41 operate to generate braking force $F_1$ and $F_2$.

In FIG. 1, compressed air is stored in pressure tank P. When the driver presses on the brake pedal the high pressure air is conducted through a master brake control valve 1, and exits from valve 1 at pressure $P_0$ which is proportioned to the driver's pressure on the brake pedal.

The control pressure $P_0$ is conducted through a limiting valve 5, to be described later, where it exits as pressure $P_1$ which is then conducted to the pilot brake assembly 2 where it acts against the area $A_1$ of piston 22, forcing the pilot brake pad 21 into contact with the brake disc 9 causing a restraining force $F_1$ to be generated such that $F_1 = P_1 A_1 \mu$ where $\mu$ is the coefficient of friction between the brake pad 21 or 41 and the disc 9.

The pilot brake assembly 2 includes a pilot brake cylinder 23 and piston 22 which are mounted on pilot brake assembly arm 24. In FIG. 3, the pilot brake assembly arm 24 is pivoted on shaft 25 which is fastened to the brake mounting means 26. The pilot brake arm is capable of rotation through a small angle in the plane of the disc. When the pilot brake assembly is energized by control pressure $P_1$ from the master brake control valve 1, the force $F_1$ is mechanically transmitted to the spool of the balancing valve 3 by virtue of the pilot brake assembly's freedom to move toward the valve 3. Force $F_1$ transmitted by the displacement of pilot brake assembly 2, causes the balancing valve 3 to shift from the center position A to position B, thus allowing fluid communication between ports 31 and 32 resulting in a new pressure $P_2$ appearing at port 32 and being transmitted to the main brake assembly 4 and the control port 33 of valve 3. The pressure operating at control port 33 acts against spool area $A_2$ in opposition to Force $F_1$ such that when $$P_2 = F_1/A_2$$

the valve 3 returns to the center position A cutting off the supply pressure $P_1$ and thus limiting the main brake pressure $P_2$ to $F_1/A_2$.

As the main brake assembly 4 is energized a second frictional braking force $F_2$ is generated which is a function of $F_1$. The sum of the braking forces $F_1$ and $F_2$ is the total braking force $F_B$. When the brakes are applied, the braking force $F_B$ acts on a moment arm or effective brake radius $R_B$ and creates a total braking torque $T_B$ such that $T_B = (F_1 + F_2) R_B$.

In any braking system, the brake torque $T_B$ is opposed by an equal and opposite wheel torque $T_s$ where $T_s$ is the product of the tangential force $F_s$ applied by the road to the wheel where $R_s$ is the outside wheel radius.

$$T_B = T_s$$
$$T_B = F_s R_s$$

Since the road force $F_s$ must always be equal in magnitude to the mass M of the vehicle multiplied by the deceleration of the vehicle (F=Ma)

$$T_B = MaR_s$$

there is at all times a limit on $F_s$ which is dependent on the road condition. This limit is $$F_s = \mu_s W$$

where $\mu_s$ is the coefficient of friction between the road and the wheel and where W is the weight of the vehicle. Thus the limit on $T_B$ is $$T_B \text{ (Limit)} = \mu_s W R_s$$

It is a well established fact that the friction coefficient $\mu_s$ is not a constant but varies with tire slip and that the maximum possible $\mu_s$ occurs on most surfaces at approximately 25% slip. Thus, the ideal brake will apply a force $F_B = MaR_s/R_B$, to cause the required vehicle deceleration, but will never allow Ma to exceed $\mu_{sm}W$ where $\mu_{sm}$ is the maximum possible $\mu_s$ for that particular tire-road condition.

Referring again to FIG. 1, as the driver increases $P_o$ and therefore $P_1$, the pressure $P_2$ also increases due to increasing $F_1$, since $P_2 = F_1/A_2$, thus tending to center valve 3 in position A. As the braking forces increase, the tire starts to slip on the road but the tire-road friction coefficient $\mu_s$ increases and in turn causes an increase in $F_1$. When the optimum slip point is reached, however, $F_1$ can no longer increase and thus $P_2$ becomes a constant.

The driver may still increase $P_o$, however, but this increase in $P_o$ is prevented from being transferred to $P_1$ by the limiting valve 5 which compares $P_1$ and $P_2$. When the limiting valve 5 detects an increase in $P_1$ with no proportional increase in $P_2$, the limiting valve cuts off the pressure supply $P_o$ so that further increases in $P_o$ cannot be transmitted to $P_1$ and $P_1$ now also becomes constant regardless of operator pressure on the brake pedal. Value 5 operates by comparing $P_1 A_5$ against $P_2 A_6$ plus spring force of spring 51. When $P_1 A_5$ exceeds $P_2 A_6$ + Spring 51, the valve shifts to the shut-off position B. The spring 51 is so sized that the pilot brake 2 displaces the control valve 3 before the limiting valve 5 is switched to the B position.

Referring again to FIG. 1, when the driver is making a normal stop and valve 5 is in the A position, if he wishes to release the brakes he merely lifts his foot off the brake pedal thus venting $P_o$ and $P_1$ to atmosphere through $V_1$, thus decreasing the pilot brake force $F_1$.

When $F_1$ is decreased the force $P_2 A_3$ is now greater than $F_1$ and forces the balancing valve 3 into position C thus venting $P_2$ to atmosphere through $V_2$ and releasing or reducing the main brake effect of 4 until $P_2 A_3$ again equals $F_1$ at which time valve 3 returns to center.

If the driver had made a hard stop and limiting valve 5 had been in the B position, the pressure $P_1$ would have relieved through the flow check valve 7 when $P_o$ was decreased and the brake would have been released in the same manner as the normal stop.

If for some reason $P_2 A_2$ should exceed $F_1$ indicating that the optimum brake point may have been exceeded, the balancing valve 3 would be forced into position C automatically venting the main brake assembly and reducing $P_2$ to the point where $P_2 A_2 = F_1$ thus releasing the brake pressure until the optimum braking point is again maintained and then recentering the balancing valve 3.

Normally the design values of $P_1 P_2 A_1$ and $A_3$ would be chosen such that the pilot brake alone is sufficient to handle the vehicle when backing up or holding on an upgrade. For special applications, such as large trucks where additional reverse braking is required, a second valve 6 is included. Back up valve 6 is a two position valve, spring loaded in its normal A position and mechanically switched to the B position by the movement of the pilot brake assembly which moves toward valve 6 if the brakes are applied when the vehicle is backing up or holding on an upgrade.

For normal forward operating conditions, valve 6 in the A position does nothing but allow valve 3 to vent through it. When the brakes are applied in backing up or holding on an upgrade, the Force $F_1$ transmitted by the pilot brake assembly overcomes the spring force of spring 61 mechanically shifting valve 6 from position A to position B thus connecting the main brake assembly to pressure $P_1$ also shifting valve 3 to position C to prevent venting of pressure to atmosphere.

Releasing the pressure on the brake pedal vents the pilot valve, reducing $F_1$ and allowing spring 61 to return the backing valve 6 to its normal position which vents $P_2$ until valve 3 returns to center and the main brake is released.

Another version of the present anti-skid brake system is shown in FIG. 2. This version is designed as a hydraulic system instead of as a pneumatic system as shown in FIG. 1.

The principle and operation of the hydraulic system shown in FIG. 2 is exactly the same as the pneumatic system shown in FIG. 1 except for the following changes. A conventional hydraulic master cylinder is substituted for the pneumatic control valve. All lines that were vented to atmosphere in the pneumatic system of FIG. 1 are now returned to the master cylinder in the hydraulic unit of FIG. 2 to prevent loss of hydraulic fluid and in order to prevent lock-up of the limiting valve 5 and the balancing valve 3 due to lack of fluid compressibility, free pistons 52 and springs 53 are added to valve 5; and free piston 34 and spring 35 is added to valve 3. The volumes occupied by springs 52 and 35 are vented to atmosphere or to the master cylinder reservoir through port R.

FIGS. 3 and 4 illustrate the operation of the pilot brake assembly 2, connected by the pivoting arm 24 pivoting on shaft 25 on the brake mounting frame 26. The pilot brake assembly operates piston 21 against brake disc 9 which pivots the assembly on arm 24 in a forward or reserve direction to engage valve members 36 or 62 of valves 3 and 6 to operate the system as described.

Valves 5, 6, and 3 may each be spool or piston valves sliding in cylinders. Valve 5 may have a centering spring 51, while valve 6 may have a centering spring 61, and valve 3 may have a pair of centering springs 37. In operation, pressure is applied to the master brake cylinder 1 which applies fluid pressure through the valve 5 to the pilot brake assembly 2, thereby actuating the piston 22 against the brake disc 9. If the brake disc 9 is rotating in either direction, it will force the pilot brake assembly 2 to rotate slightly on the shaft 25 thereby driving the protruding portion of the pilot brake assembly 2 against either sliding rod 36 or 62, thereby actuating either the master control valve 3 or the reverse control valve 6 to allow pressure generated by the brake cylinder 1 to be applied to the main brake system 4 driving the piston and braking pads 41 against the rotating braking disc 9 to brake the rotating wheel. The pilot brake 2 however will read an approaching skid condition which reduces the force applied by the pilot brake against sliding rod 36. The pressure from the auxiliary line 33 applied to the opposite side of the spool valve 3 will then be able to drive valve 3 to a closed position against the reduced pressure of the pilot brake 2. As the pilot brake assembly 3 closes it will shut off the pressure being applied at 33 reducing the force required for the pilot brake 2 to push the valve toward the open position. If the pilot brake 2 continues to monitor a skid condition while the operator continues to apply additional pressure, the pilot brake 2 alone would induce skidding by the braking force of the pilot brake. Accordingly, the limiting valve 5 will have greater and greater pressure applied at $A_5$ while a reduced amount of pressure is being applied by the auxiliary main braking fluid circuit at $A_6$, thereby momentarily reducing or disengaging the pressure to the pilot brake assembly 2 to prevent skidding induced by the pilot brake.

It should be clear at this point to those skilled in the art that an anti-skid braking system which can be pneumatically or hydraulically operated has been provided. This invention is not, however, to be construed as limited to the particular forms disclosed herein since these are to be regarded as illustrative rather than restrictive.

I claim:

1. An anti-skid brake system comprising in combination:
    a. brake pedal means for actuation by an operator;
    b. master cylinder means operatively connected to said brake pedal means for actuation of a brake system responsive to actuation of said brake pedal means;
    c. a pilot brake means operatively connected to said master cylinder means for actuation by said master cylinder means to apply frictional braking force to resist a rotating wheel, said pilot brake means having at least a portion thereof movably responsive to said rotating wheel when said pilot brake means is resisting the rotation of said wheel;
    d. a force balancing main control valve in fluid connection with the master cylinder means, said force balancing main control valve being mechanically operated in one direction by the movement of said pilot brake means as the pilot brake means resists wheel rotation;
    e. main brake means operatively connected to said master cylinder means through said force balancing main control valve for actuation thereby by the movement of said force balancing main control valve responsive to the actuation of said pilot brake means to resist the rotation of said wheel whereby said main brake means is responsive to force from said rotating wheel when said pilot brake is actuated to resist the rotation of said wheel, said force balancing main control valve controlling fluid pressure in the main brake means and being operated in opposition to the movement of the pilot brake means by the main brake fluid pressure;
    f. a second control valve means in fluid connection with the main brake fluid circuit and the force balancing main control valve assembly being mechanically operated by the movement of the pilot brake as the pilot brake resists wheel rotation when backing up or holding on an upgrade.

2. The apparatus in accordance with claim 1 in which said pilot brake means operates at least one slidable piston connected thereto and slidable in a cylinder responsive to the movement of at least a portion of said pilot brake means to control fluid pressure responsive to said sliding piston to drive said main brake means and said pilot brake means having brake pads for actuation against a rotatable brake disc attached to said rotating wheel for rotation with said wheel and said piston being controlled in part by the movement of said pilot brake braking pads engaging said rotating disc.

3. The apparatus in accordance with claim 2 in which there is a second piston slidable in a cylinder responsive to braking said rotating brake disc, said second slidable piston being actuated when a portion of said pilot brake means moves in a reverse direction as when the brake is applied when the vehicle is backing up or holding on an upgrade, said second slidable piston being actuated when said pilot brake means is moved responsive to the braking of said rotating wheel brake disc.

4. A vehicle wheel anti-skid braking system in accordance with claim 1 in which said main brake means has a main brake fluid circuit connecting said main brake means with said force balancing main control valve to apply a force to said force balancing main control valve opposing the force of said pilot brake means whereby a reduced force from said pilot brake means upon increased fluid pressure from said master cylinder means tends to close said force balancing main control valve.

5. The apparatus in accordance with claim 4 in which a third control valve is operatively connected to said master cylinder means and to said main brake fluid circuit to shut off the pilot braking means upon increase in said fluid pressure from said master cylinder without sufficient pressure from said main brake fluid circuit whereby braking by said pilot brake means is reduced under skid conditions.

6. An anti-skid brake system comprising in combination:

a. a main brake for braking a rotating wheel when actuated by fluid pressure;
b. a force balancing main control valve operatively connected to said main brake for regulating the fluid pressure applied to said main brake;
c. fluid pressure generating means operatively connected to said force balancing main control valve for applying fluid pressure to said main brake through said force balancing main control valve when said force balancing main control valve is at least partially open;
d. a pilot brake having a pilot brake movable portion movably connected to the main brake for applying a braking force to said rotating wheel when actuated and being operatively connected to said fluid pressure generating means for appling fluid pressure from said fluid pressure generating means to said pilot brake to actuate said pilot brake, said pilot brake having said movable portion movably mounted to a support of said main brake for movement when a braking force is applied by said pilot brake, said movable portion of said pilot brake located to activate said force balancing main control valve when the movable portion of said pilot brake is moved responsive to said pilot braking force, resisting rotation of said rotating wheel, whereby said main brake is controlled by the pilot brake.

7. The brake system in accordance with Claim 6 in which said main brake system includes a main brake fluid circuit connecting said main brake to said force balancing main control valve, said main brake fluid circuit also having an auxiliary connection to said force balancing main control valve for applying fluid pressure opposing said force balancing main valve actuation by said pilot brake responsive to the fluid pressure in said main brake fluid circuit.

8. The brake system in accordance with claim 7 in which said main brake fluid circuit auxiliary line applies fluid pressure to a piston sliding in a cylinder in said force balancing main control valve.

9. The brake system in accordance with claim 8 in which a reverse control valve is located adjacent said movable portion of said pilot brake and actuated by movement of said movable portion of said pilot brake responsive to a braking force on said pilot brake resisting rotation of said rotating wheel in an opposite direction from the rotation required to actuate said main control valve.

10. A brake system in accordance with claim 9 in which said reverse control valve and said main control valve each include slidable pistons in a cylinder, mechanically operable by the movement of said pilot brake and each having spring centering means.

11. A brake system in accordance with claim 7 including a limiting valve operatively connected to said fluid pressure generating means and to said main brake fluid circuit for disengaging said pilot brake responsive to increased pressure from said fluid pressure generating means when said main brake fluid circuit has reduced pressure therein whereby said pilot brake is prevented from causing skidding by increased fluid pressure applied thereto.

12. A brake system in accordance with claim 11 in which said limiting valve has a slidable piston in a cylinder slidable in two directions responsive to fluid pressure from said main brake fluid circuit on one side thereof and from the pilot brake fluid circuit on the opposite side thereof.

13. A brake system in accordance with claim 6 in which said pilot brake is mounted on a pivotable arm to allow movement in two directions responsive to a rotating wheel having a braking force applied thereto by said pilot brake.

14. A brake system in accordance with claim 13 in which said rotating wheel has a brake disc attached thereto and said pilot brake and said main brake each including brake pads for engaging said rotatable disc responsive to fluid pressure.

15. An anti-skid system comprising in combination:
a. a rotatable wheel;
b. a rotatable disc attached to said rotatable wheel for rotation therewith;
c. a fluid actuated first brake means having a fluid driven brake shoe and brake pad thereon for engaging said rotatable disc when actuated;
d. fluid pressure control means operatively connected to said first brake means for controlling fluid pressure when said first brake means is actuated against a rotating disc by the movement of a portion of said first brake means; and
e. a brake fluid actuated second brake means having a fluid driven brake shoe and brake pads and being operatively connected to said first brake means fluid pressure control means for actuation thereby;
f. said first brake means having a brake cylinder for actuating said brake pads to contact with said rotatable disc; and said fluid pressure control means having a pair of pistons each riding in a cylinder, said pistons being operatively connected to said first brake means for actuation by the movement of said first brake means responsive to the engagement of said first brake means with a rotating rotatable disc, one cylinder being actuated for each direction of rotation of said rotatable disc.

16. An anti-skid brake system in accordance with claim 15 in which said brake system has a master cylinder fluid pressure generating means actuatable by an operator and operatively connected to said first brake means and a limiting valve means connected between said master cylinder fluid pressure generating means and said first brake means for limiting the pressure in said first brake means under predetermined conditions.

* * * * *